April 2, 1935. H. D. HUME ET AL 1,996,294
HARVESTER
Filed Feb. 27, 1934
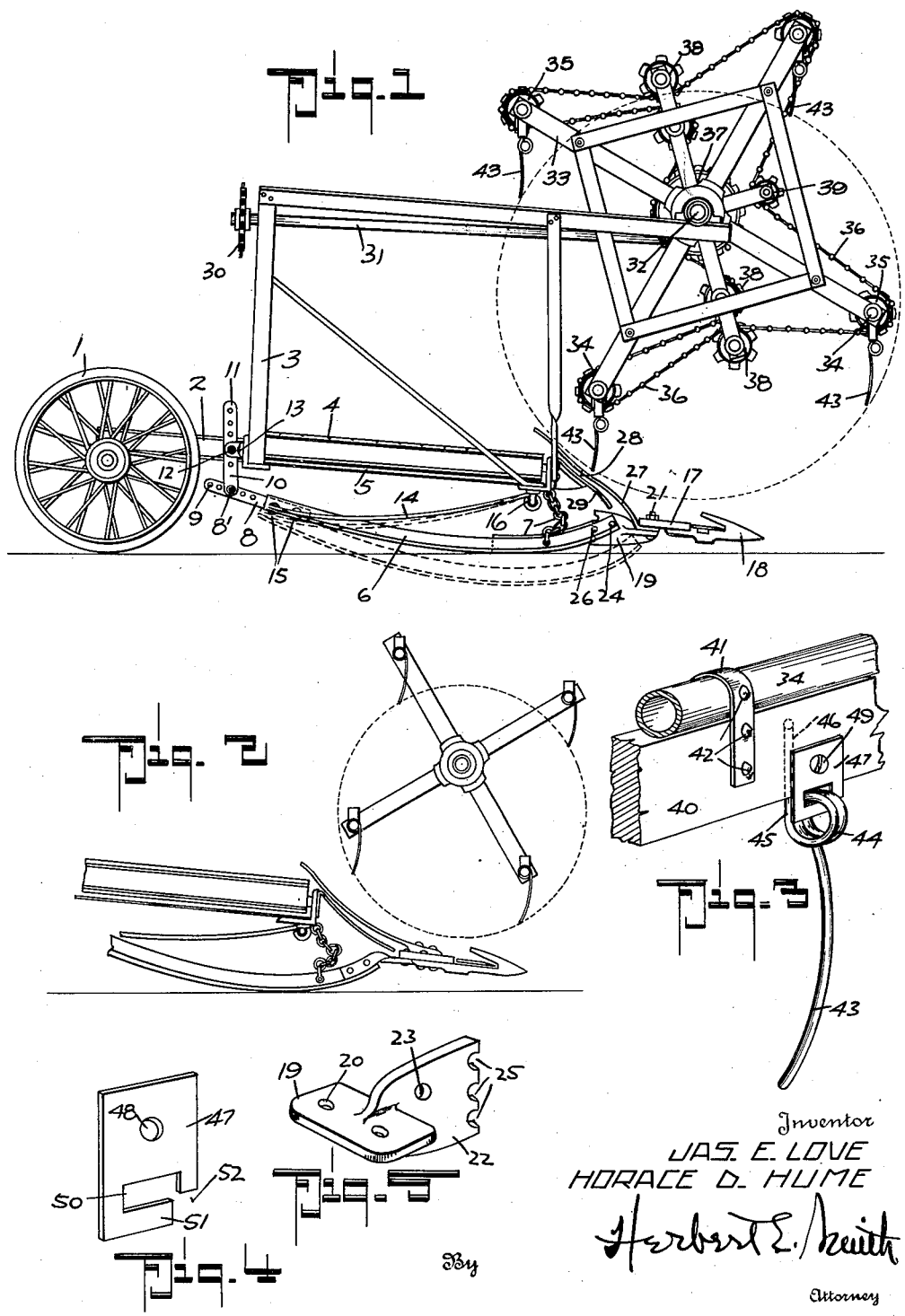
Inventor
JAS. E. LOVE
HORACE D. HUME
Herbert E. Smith
By
Attorney Patented Apr. 2, 1935

1,996,294

UNITED STATES PATENT OFFICE 1,996,294

HARVESTER

Horace D. Hume and James E. Love, Garfield, Wash.

Application February 27, 1934, Serial No. 713,101

14 Claims. (Cl. 56—181)

Our present invention relates to improvements in harvesters of the side cutting, sickle type, wherein the finger bar of the sickle or reciprocating cutter projects to one side of the path of the threshing machine, and a reel rotating on its horizontal axis is employed to gather the vegetation for the cutter. The harvester may or may not be combined with a threshing machine for harvesting grains, beans, peas, and other crops, under favorable conditions of growth, and it is especially adapted for the additional purpose of gathering and harvesting down or fallen grain, and for vines and vegetation which grow close to, or lie on the ground.

Under heretofore prevalent conditions in harvesting and threshing, a material loss has been sustained in the crop for the reason that this type of machine in general use has failed to effectively gather the down, fallen, bunched or tangled vegetation and grains, and therefore the cutter has been unable to cut the entire crop. Further material losses in wasted time and in the harvested crop have been sustained, especially in harvesting peas, beans, and other similar vegetations, after the cut vines have been passed, by the rotating reel, from the sickle to the draper or conveyer at the rear of the cutter. In this movement of the vines they become tangled and lodged in the parts of the conveying devices, and frequently result in breaking of the operating parts, and also in accidental separation of the pods from the vines and consequent loss in the crop.

In order to avoid these losses, and to insure an effective gathering and conveying of the harvested crop to the thresher without material loss, we have introduced certain improvements in the mounting of the sickle or cutting mechanism, and in the rotating reel in its relation to the cutting mechanism whereby the harvester is readily adapted for both standing and fallen vegetation. The invention consists in certain novel combinations and arrangements of parts for the above purpose as will hereinafter be more fully set forth and claimed. In the accompanying drawing we have illustrated one complete example of the physical embodiment of our invention wherein the parts are combined and arranged according to one mode we have thus far devised for the practical application of the principles of our invention.

Figure 1 is a view in side elevation at the right hand side of a side-cutting harvester, showing the sickle and its mounting, together with the rotary reel or gatherer, and indicating by dotted lines the adjustment of the sickle and its mounting.

Figure 2 is a diagrammatic view for the purpose of indicating the ineffectiveness of prior harvesters in adapting the cutter to low-growing vines or fallen grain and also in the operation of the rotary reel.

Figure 3 is a fragmentary view in perspective, showing one of the reel-bats with a gathering-tine thereon.

Figure 4 is a perspective view of one of the attaching plates for the reel-tines.

Figure 5 is a perspective view of one of the front supporting brackets for the adjustable shoes or runners of the sickle.

The laterally arranged header as a whole, as it projects at the right hand side of the thresher, is supported on a pair of rear wheels, one of which is designated as 1 in Figure 1, and the horizontal frame 2 and header frame 3, together with the draper or transversely-arranged endless-conveyer 4, for the harvested or cut crop, are or may be of usual construction. The draper 4 is supported in its frame 5 at the rear of the sickle or cutting mechanism, and the draper is designed to convey the cut vegetation away from the observer in Figure 1.

The header, in front of the wheels 1, is supported on a number of shoes or runners, 6 which are preferably fashioned of light angle irons and curved as indicated, and these shoes extend rearwardly from the sickle parallel with the path of the forwardly moving machine. Safety chains as 7, connect the front portions of the shoes with the header frame, and these chains or similar safety devices, are of sufficient length to permit adjustment of the shoes and sickle with relation to the header frame.

At their rear ends the shoes are provided with extensions 8 each provided with a number of spaced bolt holes 9, and by means of these extensions the shoes are coupled to adjustable suspending links 10 which are also provided with a series of bolt holes 11. By means of bolts 8' passed through a bolt hole of the link and through a selected hole 9 of the extension, the shoes may be adjusted longitudinally and flexibly supported from the links.

The links, which are pivotally supported on bolts 12 in brackets 13 fixed to the header frame, are adjusted to desired height above the ground by use of the holes 11, and by means of these links the rear ends of the shoes may be suspended in either elevated or lowered position for adapting the shoes to the surface of the ground.

Each shoe is coupled with the front end of the header frame by means of a resilient blade or leaf 14, which at its rear end if fixed, as by bolts 15 to the shoe, while the front end of the leaf or blade is pivoted or hinged at 16 beneath the front edge of the header frame. These resilient blades or leaves provide a spring suspension for the shoes beneath the header frame and they also perform the functions of draw-bars between the frame and the flexibly supported shoes.

The sickle or reciprocating cutter which may be of usual or suitable type, is mounted in front of the frame and the shoes, and the fingerbar 17 and guard fingers 18 are illustrated to indicate the cutting mechanism in its relation to the draper and the rotating reel or gatherer. In the physical embodiment and reduction to practice of our invention we have employed four shoes or runners 6 and they are coupled at their front ends to the sickle at its rear edge by means of four adjusting brackets indicated in Figure 5, and shown in use in Figure 1. Each of these brackets includes a horizontally disposed plate 19 with bolt holes 20, and by means of bolts 21 the bracket is firmly attached to the finger bar 17. A vertically disposed integral plate 22 projects to the rear of the horizontal attaching plate 19 and this plate is fastened with one bolt hole 23 for a bolt 24 that passes through a hole in the end of the shoe and fastens the shoe to the bracket. As best seen in Figure 5 the rear edge of the vertical plate is notched as at 25, and a bolt 26 is passed through the shoe for seating in one of these notches. Or the part 26 may be a pin rigid with the shoe and projecting laterally therefrom and adapted to seat in a selected notch 25.

Thus, by means of these attaching brackets the sickle may be adjusted for the purpose of depressing the points of the guard fingers 18, or for elevating them, the adjustment being effected by the location of the pin 26 in a desired notch, and then the bolt 24 is tightened to secure the sickle and the shoe in their adjusted relative positions.

By the use of the co-acting parts which suspend the rear ends of the shoes and the use of these brackets at the front ends of the shoes, a predetermined adjustment of the shoes and the sickle is attained, but in addition it will be apparent that the flexible and resilient mounting of the shoes beneath the header frame also permits adjustment of the shoes to various conditions or irregularities in the ground, and this variation is indicated by the dotted line position of the shoe in Figure 1.

The sickle is operated in suitable manner to reciprocate the cutting knives, and after the vines, or vegetation, are cut the vines pass rearwardly over the top of the sickle, and are supported and guided by means of a series of spaced supplemental fingers 27. The front ends of these fingers are rigidly attached to the sickle and they extend upwardly and rearwardly parallel with the path of movement of the thresher, terminating, as seen in Figure 1 back of the front edge of the draper 4. Each of these supplemental fingers 27 is curved as at 28, and the series of spaced fingers, due to these curves, forms a concave extending parallel with the sickle and conforming as an arc to the peripheral sweep of the tines 43 of the rotating reel, as will be described.

Beneath this open concave that is formed by the series of supplemental fingers 27 is located an apron 29 with its rear edge fixed to the draper frame, and its front free edge terminating at the rear of the sickle. The apron, in cross section, conforms to the shape of the concave, and the apron inclines upwardly and rearwardly, terminating at the upper or conveying flight of the draper.

As indicated by the dotted circle in Figure 1 the free ends of the reel-tines 43 sweep through a comparatively large circle, down in front of the sickle, above the top of the sickle, and then upwardly and rearwardly across the concave formed by the supplemental fingers, for gathering and conveying the crop. If necessary, the front edge of the sickle is depressed to pick up fallen grain or low growing vines, and these vines also are gathered by the reel-tines, passed to the rear after having been cut by the sickle, and the reel-tines co-operating with the concave and the apron, pass the harvested vines upwardly and rearwardly until they fall upon the draper and are disposed of in suitable manner.

It will be noted in Figure 1 that the tines follow closely the contour of the concave until the vines are delivered to the draper and no space is permitted in which the vines may become tangled or lodged between the sickle and the draper. Such a space is indicated in Figure 2 between the sweep of the reel-tines and the supplemental fingers, and due to the presence of this space the vines do become tangled and do lodge on the fingers, choking the operation of the machine and frequently causing breakage of the operating parts of the machine. By our arrangement disclosed in Figure 1, the reel-tines and the concave are instrumental in continuously passing the vines to the draper thus maintaining the movement of the cut vines to the draper without interruption and insuring a continuous uninterrupted flow of the vines as they are harvested.

The rotary-reel or gatherer which is supported in front of the header and above the sickle is driven through a sprocket wheel 30 and shaft 31 to the reel shaft 32 that is journaled in suitable manner in a forward extension of the header. One of the spiders 33 of the reel is shown fixed to and rotating with the reel shaft, and four bats, as 34 are mounted in the spiders. These bats are in the form of tubular shafts journaled in the two end spiders, and each bat-shaft is provided with a sprocket wheel 35 over which an endless chain 36 passes to turn the bat shaft on its horizontal axis to insure a supplemental movement in addition to the rotary movement of the reel. This supplemental movement of the bat-shafts effects a movement of the reel-tines 43 so that these tines are maintained at all times in position substantially perpendicular to the ground surface, as indicated in Figure 1.

The sprocket chain 36 passes around a large central sprocket wheel 37 that is non-rotatable, and guide sprockets 38 and a tension sprocket 39 are mounted on the spider frame for co-action with the chain in guiding it and in insuring the required tautness for the chain.

As best seen in Figure 3 the bat-shafts 34 are each provided with a bat-bar 40 of wood that extends parallel with the bat-shaft but terminates short of the journaled ends of the bat-shaft, and the bar is rigidly secured to the shaft by means of a number of attaching straps or loops 41 that are bolted to these parts at 42. These bat-bars form tine-holders for the reel-tines 43, and it will be apparent that these holders and their tines may be detached from the bat-shafts, if desired, for the purpose of substituting other holders and tines adapted for other purposes.

The reel-tines 43, fashioned from suitable sizes of wire, are resilient, and they are fashioned with spring coils 44 near their upper ends, and the upper ends of the tines, as 45 are straightened and inserted up into sockets or holes 46 that extend upwardly into the holder 40 from its lower edge. The upper ends of the tines are thus anchored in the holder, and the coil 44 of the tine is mounted in a holder plate 47 having a bolt hole 48 for the bolt 49 that attaches the plate to the front face of the holder 40, as seen in Figure 3. The holder plate is slotted at 50 to form a bottom bar 51 over which the coil 44 of the tine is slipped, and the plate is cut away or notched out at one corner, as 52, to permit insertion of the coil into the slot 50 of the plate.

The tubular bat-shafts and the wooden bars or holders insure a comparatively light but strong construction for the reel and the detachable fastenings between the holders and the bat-shafts permit facile changes in removal of the holders and their tines and in the replacement, or substitution, of other parts when desirable or necessary.

The whole implement as illustrated in Figure 1 and coupled with the threshing machine provides a comparatively light but strong and durable structure, and the several parts of the implement may with facility be adjusted to meet various conditions in harvesting to insure effective, smooth, and rapid operations in the performance of the functions of the implement.

Having thus fully described our invention, what we claim as new and desire to secure by Letters Patent is:—

1. In a harvesting machine, the combination with a supporting frame and cutting mechanism, of a shoe attached to the cutting mechanism and located beneath the frame, means for suspending the rear portion of the shoe from said frame, and a resilient draft-member connecting the front portion of the frame with the rear portion of the shoe.

2. In a harvesting machine, the combination with a supporting frame and cutting mechanism located in advance thereof, of a shoe and adjustable means for fixing said shoe to the cutting mechanism, means for supporting the shoe at the rear of the frame, and a resilient draft-member connecting the front portion of the frame with the rear portion of the shoe.

3. In a harvesting machine, the combination with a supporting frame and cutting mechanism located in advance thereof, of a shoe, connecting means between said shoe and cutting mechanism, and a resilient draft-member connecting the frame with the shoe, and interposed between said parts.

4. In a harvesting machine, the combination with a supporting frame and cutting mechanism, of a shoe, flexible means for suspending said shoe from the rear of the frame, adjustable means for securing said shoe to said mechanism, and a resilient draft-member between the frame and shoe and connecting these members.

5. In a harvesting machine, the combination with a supporting frame and cutting mechanism in advance thereof, of a shoe beneath the frame, flexible means for suspending said shoe at the rear of the frame, adjustable means for securing the front of the shoe to said cutting mechanism, a spring draft-member having its rear end attached to said shoe, and a pivotal connection between the front end of said draft member and the frame.

6. In a harvesting machine, the combination with a frame and cutting mechanism, of a shoe, a pivoted suspending link mounted at the rear of the frame and a pivotal connection between said link and the rear end of the shoe, adjustable means for securing the front end of the shoe to said cutting mechanism, a spring draft-member having its rear end attached to said shoe, and a pivotal connection between the front end of the draft-member and said frame.

7. In a harvester, the combination with cutting mechanism and a shoe, of an attaching bracket fixed to said cutting mechanism, a pivotal connection between said shoe and bracket, and coacting means on the bracket and shoe for rigidly holding the cutting mechanism and shoe in adjusted relation.

8. In a harvester, the combination with cutting mechanism and a shoe, of an attaching bracket fixed to the cutting mechanism, a bolt securing the front end of the shoe to said bracket, said bracket having a series of notches at its rear edge, and a pin rigid with the shoe seated in one of said notches.

9. In a harvester, the combination with a sickle and a transversely arranged draper at the rear thereof, of a series of spaced supplemental fingers located at the rear of and having their front ends attached to the sickle and extending upwardly and rearwardly toward the draper, said fingers having alined arcuate depressions forming a concave, a rotary reel above the sickle and operating means therefor, and said reel adapted to sweep transversely across said concave in close proximity to said fingers.

10. In a harvester, the combination with a sickle, a transversely arranged draper at the rear of the sickle, and an apron bridging the space between the sickle and draper, of a series of spaced fingers attached to the sickle and extending upwardly and rearwardly above the apron, said fingers having arcuate depressions forming a concave, a rotary reel above the sickle and operating means therefor, and tines on said reel adapted to sweep transversely across the concave in close proximity to said fingers.

11. In a harvester, the combination with a bat-shaft and a tine-holder mounted thereon of an attaching plate having a slot and fixed to said holder, a spring-tine having one end fixed to the holder, and a coiled portion of said tine mounted in the slot of said plate.

12. In a harvester of the rotary reel type, the combination with cutting mechanism and a transversely arranged conveyer, of a flexible apron of resilient material rigidly mounted at its front end on the cutting mechanism and extending rearwardly and upwardly from said cutting mechanism toward the conveyer, said flexible apron having arcuate portions forming a concave, a rotary reel and operating means therefor, and tines on said reel adapted to sweep transversely across said apron, and adjacent thereto.

13. In a harvester, the combination with a sickle, a transversely arranged draper at the rear of the sickle, and an apron bridging the space between the sickle and the draper, of a rotary reel above the sickle and operating means therefor, said apron extending rearwardly and upwardly from the sickle to the draper, and said apron having resilient and flexible portions forming a concave conforming to the peripheral sweep of the reel.

14. In a harvester, the combination with a supporting frame and a sickle, a transversely arranged draper at the rear of the sickle a shoe attached to the cutting mechanism and located beneath the frame, means for suspending the rear portion of the shoe from the frame, and a resilient draft member connecting the front portion of the frame with the rear portion of the shoe, of an apron bridging the space between the sickle and the draper and extending upwardly from the former to the latter, a rotary reel and operating means therefor, and said apron having resilient and flexible portions forming a concave conforming to the peripheral sweep of the reel.

HORACE D. HUME.
JAMES E. LOVE.